Feb. 5, 1935.   C. J. HOLLAND   1,990,377
COMBINATION TRUCK SPRING
Original Filed July 25, 1927

Inventor
Cyrus J. Holland
By Ernest P. Mechlin
Attorney

Patented Feb. 5, 1935

1,990,377

UNITED STATES PATENT OFFICE 1,990,377

COMBINATION TRUCK SPRING

Cyrus J. Holland, Chicago, Ill., assignor to Holland Company, Chicago, Ill., a corporation of Illinois Original application July 25, 1927, Serial No. 208,349. Divided and this application October 29, 1930, Serial No. 492,047

15 Claims. (Cl. 267—4)

This application is a division of my application for patent for volute spring structure for railway trucks, filed July 25th, 1927, Serial No. 208,349.

The invention relates to cushioning devices or spring means for general use, particularly for employment in the running gear of vehicles, and especially in railway trucks for resiliently supporting the load.

Until about ten years ago the provision of cushioning means in railway freight car trucks was a comparatively simple problem to solve, a common practice being to provide a suitable number of helical springs interposed between the spring plank and the bolster because the standard A. R. A. double coil freight car truck spring provided the necessary capacity for the various classes of cars by varying the number of coils used in accordance with the capacity of the car. Ordinarily, the window opening in such trucks, both arch bar and cast steel truck side frame, limited the number of springs in the nest to five double coils. About ten years ago the American Railway Association changed the method of figuring the capacity of a car so that a 100,000 pound capacity car, which at that time was permitted to carry a 10% overload, became a car that could carry a maximum of 169,000 pounds including the weight of the car. This change permitted cars to be loaded heavier under the new ruling than under the old and developed the fact that the four double coil spring nest did not have sufficient capacity to take care of the new load. The A. R. A. have since that time endeavored to increase the capacity of their standard double coil truck spring from 16,000 pounds to 20,000 pounds per double coil. In an effort to do this they designed a chrome molybdenum double coil spring fully described in the Car Builders Encyclopedia of 1922 and subsequent issues. However, this spring appears not to have met the requirements because it has not gone into general use and as an alternative cars of 169,000 pounds capacity and over have generally been equipped with the Dalman or similar type of truck in which a larger window opening is provided which permits of using more coils in the spring nest. Increasing the number of A. R. A. truck spring coils in a spring nest provides sufficient capacity to take care of the heavy load but has the disadvantage of also decreasing the resiliency under light and intermediate loads.

A further difficulty experienced in all freight car trucks equipped with helical springs is due to oscillation, it being a fact that the period of oscillation in helical springs synchronizing with the shock resulting from the passage of the car wheels over rail joints or other shocks transmitted to the car body during train movement causes these oscillations to build up excessive vertical movement of the springs and car body roll. In many instances this has been of such extent as to cause derailment of the car.

The foregoing discussion will give a clear understanding as to the situation regarding springs in the railway art and this explanation is made simply for the purpose of more clearly setting forth the underlying reasons for the invention and its particular and peculiar adaptability, it being, however, distinctly understood that my invention is not in any way limited to the specific illustrative use disclosed.

Generally speaking, the object of the invention is to provide a cushioning means of greater resiliency for the light and intermediate loads and greater capacity for the heavy load without increasing the size of the elements or the number thereof, the fundamental feature consisting in the utilization of a spring group comprising the combination of a selected number of spring means capable of resiliently sustaining an oscillating load having or consisting intermediate its or their length of a plurality of surfaces adapted to have a rubbing action relative to each other or one another, said rubbing parts being substantially rectangular in cross section and a chosen number of freely movable or live springs, thereby producing, in usable and practical form, a spring suspension that will materially reduce the number and intensity of the shocks transmitted to the load, because I have combined the characteristics of the two types of springs in such manner that they are neither too lively nor too sluggish.

A further object of the invention is the provision of a new and improved spring suspension for vehicles composed of one or more springs of the type having overlapping frictionally engaging layers cooperating with free acting springs for resiliently supporting the load and dampening the vertical vibration of the spring suspension.

Another object of the invention is to provide a cushioning assembly comprising a plurality of volute springs and helical springs.

A more specific object of the invention is to provide a shock absorbing or cushioning means for resiliently supporting a vehicle body on its running gear embodying volute and helical springs arranged and operating in parallel.

The invention further contemplates the provision of an assembly of this character possessing the specified advantageous characteristics and which will yet be inexpensive to make and assemble and as easy to install as a cushioning device of ordinary pattern.

To the attainment of the foregoing and other objects and advantages, the invention preferably consists in the details of construction and the arrangement and combination of parts to be hereinafter more fully described and claimed, and illustrated in the accompanying drawing in which:

Figure 1:
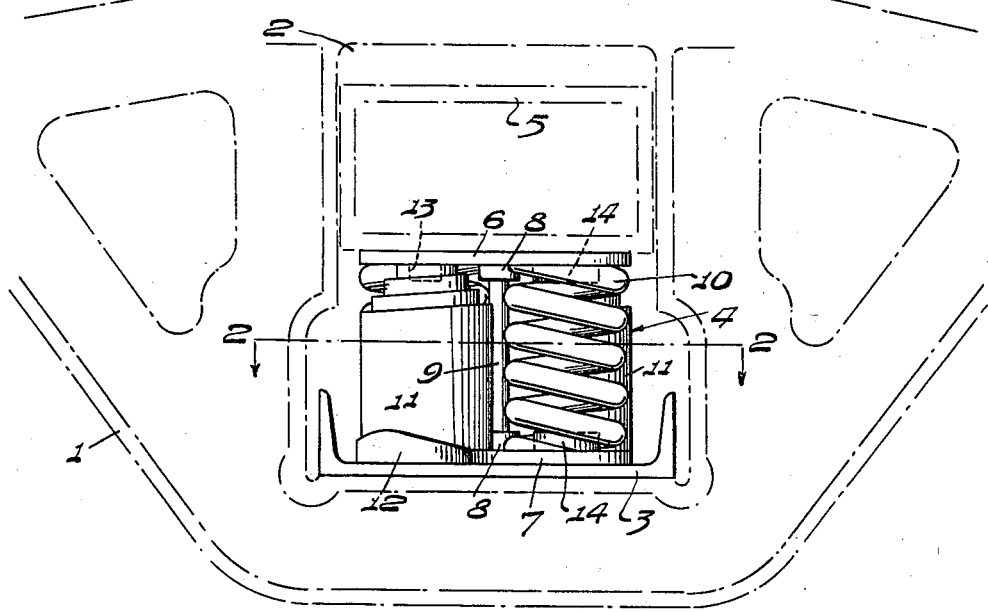
Figure 1 is a partial side elevation of a railway car truck embodying my novel spring assembly.

Referring more particularly to the drawing the numeral 1 designates a portion of the side frame of a railway truck having the usual window opening 2 within which is mounted the end of a spring plank 3 carrying the spring assembly 4 which supports the end of the bolster 5. The assembly 4 includes upper and lower caps 6 and 7 which are similar in some respects and which may be provided with any suitable means desired for maintaining them in proper position within the truck. Centrally the caps are provided with depressed portions 8 perforated for the passage of a tie bolt 9 for the purpose of holding the assembly together prior to installation within the truck.

Figure 2:
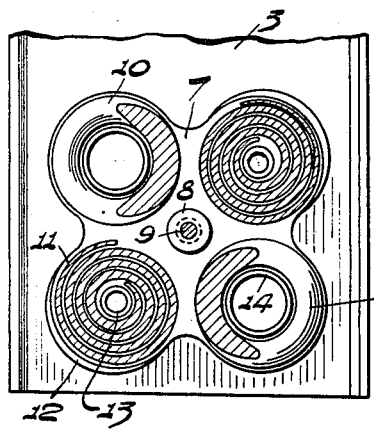
Figure 2 is a horizontal section on the line 2—2 of Figure 1.
Figure 3:
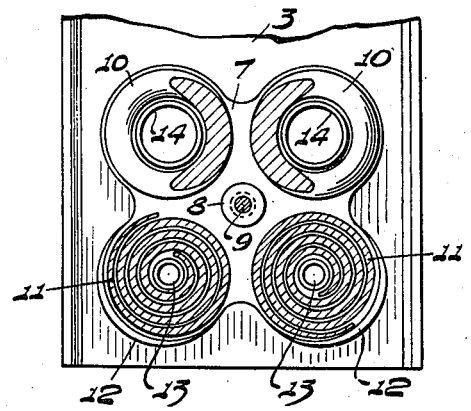
Figure 3 is a similar view showing a slightly different arrangement.

In carrying out the invention I form the cushioning assembly 4 as a combination of helical and volute springs 10 and 11, respectively, interposed between the caps 6 and 7, by the simple expedient of substituting the desired number of volute springs for a corresponding number of the helical springs. The springs may be arranged in various ways, the forms shown are by way of example only. The volute springs may be diagonally arranged as in Figures 1 and 2 to obtain a balanced effect or both at the same side of the nest or cluster as shown in Figure 3, there being no limitation in this respect.

A normal or conventional volute spring will, upon closure or compression, produce a certain amount of friction owing to the rubbing action or contacting engagement between successive convolutions, the friction generated in the operation depending on and resulting from the pressure contact between the coils, which pressure may be varied according to the specific manufacture of the spring. The greatest friction is of course obtained when the coils, in normal or uncompressed condition, are in contact and the minimum pressure resulting when the coils are spaced apart, such spacing not exceeding a minimum that will permit or bring about a pressure contact before the spring has been entirely compressed. This variation can be availed of for varying conditions of use and may be adjunctive or auxiliary to and attendant upon the capacity of the spring used to support the load. By the term "normal or conventional volute spring" is meant one which, for instance, is constructed in the usual manner by winding or coiling a strip upon a cylindrical mandrel in such manner that the successive convolutions overlie and touch one another at least at certain points. This is stated in order to define the spring in contradistinction to one which might conceivably be wound upon a stepped mandrel in such manner as to space the coils so far apart that they could never come into engagement. In my copending parent application Serial No. 208,349 I have shown volute springs with their convolutions in contact and others with their convolutions spaced slightly apart as I considered them essentially the same or equivalents in so far as action is concerned. However, it is not necessary in all instances or in the present case that all the convolutions be in actual contact throughout their lengths when uncompressed as I have found in actual practice that where I have employed a volute spring wherein there may be a slight space between the convolutions the convolutions engage and friction is developed at some point or stage during compression and, correspondingly, upon release, the amount of friction depending necessarily on the extent of spacing. The theory involved as to how or why these convolutions engage one another with a rubbing action is immaterial as the fact remains that the development of friction seems to be an inherent characteristic of springs of this type.

To maintain all the elements in proper position the caps are preferably provided at their corners with lips 12 engaging exteriorly of the larger ends of the volute springs, and at intermediate locations with pressed out flanges 13 and 14 entering the smaller ends of the volute springs and the ends of the helical springs, respectively. By this means displacement of the springs laterally in any direction will be prevented. The assembly is of course installed in the truck in the usual manner without any changes or modifications required.

In the operation it will be apparent that the load is sustained by my novel cushion assembly in the same general manner as when helical springs alone are used, the volute springs operating in parallel with the helical springs. However, in view of the fact that volute springs have a tremendously greater capacity than helical springs it is apparent that very heavy loads may be easily and properly sustained without increasing the number of springs or dimensions thereof or making any changes in the size of the window opening or other parts of the truck. Another great point of advantage is that volute springs will operate to damp out or at least greatly reduce oscillations, thereby avoiding the building up of a vertical "jiggle" which as is well known is very objectionable. From my experience it would seem that there has been a general misunderstanding on the subject of periodicity of spring vibration or oscillation. Many persons experienced in the art have labored under the belief that a helical spring of certain dimensions has a particular definite period of vibration. However, this is apparently not true as periodicity is a property of deflection and deflection is effected by load. Therefore it will appear that a helical spring is not a spring of fixed period as it will have one period under one deflection and another period under another degree of deflection. However, a volute spring and a helical spring of the same travel will not have the same periodicity for the same deflection for the reason that a helical spring settles proportionately whereas a volute spring settles progressively— that is the largest coil settles first, then the next largest, and so on. Another way of saying this is that in the volute spring the base gradually becomes longer, shortening the lever arm of the spring. However that may be, it is not my belief that springs of different periods can prevent oscillation for practical purposes, for it is logical that periods in springs will combine in the same manner as sound frequencies to produce a new frequency. In order to obtain the required dampening effect in springs it is necessary to introduce a percentage of energy absorption which should be in the form of a spring having a percentage of energy absorption as a natural characteristic, such as a volute spring or an elliptic spring. Such an arrangement will permit of greater resiliency than can be obtained by the introduction, in connection with springs, of extraneous friction devices as such, though acting to stop oscillation will more than likely result in hard riding of the lading. From the foregoing discussion it is believed that the construction, operation and advantages of my volute and helical spring combination should be readily apparent to one skilled in the art without further explanation.

While I have shown and described my invention embodied in what is commonly known as a four spring group, this is for purposes of illustration only as it is neither practical nor necessary to show every conceivable variation or adaptation, the point being that I contemplate using my spring suspension wherever such use is appropriate or advantageous. I therefore reserve the right to arrange and employ my combination of helical and volute springs in such form and in such number as will, in the space that is available, properly sustain the weight to be carried, the number and arrangement depending on the character of the rolling stock or other vehicle, the capacity necessary and also the degree of absorption required. In fact I reserve the right to make all such changes in the details of construction and arrangement as will not depart from the spirit of the invention or the scope of the claims hereunto appended.

Having thus described the invention, I claim:

1. In combination with a side frame having a bolster opening and a spring supporting portion therebeneath, a group of bolster springs supported by said portion and formed as a set of volute springs having intermediate their length surfaces adapted for a rubbing action relative to one another, with helical springs to one side thereof.

2. In combination with a side frame having a bolster opening and a spring supporting portion therebeneath, a group of bolster springs supported by said portion and formed as a set of volute springs having intermediate their length surfaces adapted for a rubbing action relative to one another, with helical springs on two sides thereof.

3. A spring group adapted for insertion in the bolster opening of a railway vehicle side frame, comprising a set of helical springs and a set of volute springs having surfaces adapted for a rubbing action relative to one another, a straight line running through the center of one of said sets intervening between the springs of the other set.

4. In a vehicle having a truck, the combination of spring mechanism for supporting a load from said truck, said mechanism comprising a spring assembly consisting of volute spring means, and helical spring means, the turns of said helical spring means being of substantially the same cross section, follower members extending across and engaging the ends of said springs and movable toward each other for causing the compression of said helical and volute spring means in parallel when said assembly is compressed, means for limiting the separation of said followers, said springs and said limiting means being located between the planes of said members, whereby said assembly may be inserted as a unit in a window opening of a car truck, the turns of said volute spring means being adapted to frictionally engage one another for dampening periodic vibrations of said mechanism while in use on a moving vehicle and constituting a means, aside from the load, for resisting the rebound of said unit after compression in service.

5. In a vehicle having a truck, the combination of spring mechanism for supporting a load from said truck, said mechanism comprising a spring assembly including volute spring means, and helical spring means, each of said spring means being formed of unitary metal stock, the turns of said helical spring means being of substantially the same cross section, members extending across and engaging the ends of said assembly for causing the compression of said helical and volute spring means in parallel when said assembly is compressed, all elements forming said assembly being located between the planes of said members, the turns of said volute spring means being adapted to frictionally engage one another for dampening the periodic vibrations of said helical spring means while in use on a moving vehicle and constituting a means, aside from the load, for resisting the rebound of said spring assembly after compression in service.

6. In a railway truck, a side frame provided with a bolster opening therein, a bolster having an end portion extending into said bolster opening, a spring assembly insertable through said opening beneath the plane of said bolster and engaging the same for supporting the bolster from said frame, said assembly comprising a plurality of springs, each having upper and lower bearing portions, certain of said springs having between the bearing portions thereof a plurality of resilient overlapping layers, each substantially rectangular in cross section, some of said resilient layers each having on its opposite sides rubbing surfaces frictionally engaging surfaces on adjacent layers for reducing harmonic spring action of said assembly, and the remainder of said springs being helical.

7. In a railway truck, a side frame having a bolster opening therein, a truck bolster having an end portion extending into said opening, a spring assembly having all its elements below the plane of said bolster, said assembly comprising a plurality of load supporting springs located in said opening and supporting said bolster from said frame, said springs offering substantially equal resistance to the downward movement of the bolster at opposite sides of the center line thereof, at least one of said springs having between its upper and lower extremities a plurality of overlapping resilient portions substantially rectangular in cross-section, some of said overlapping portions each having on its opposite sides friction surfaces for frictionally engaging surfaces on adjacent resilient portions for preventing harmonic spring action of said spring assembly and constituting a means aside from the load for yieldingly resisting the rebound of said resilient portions after compression, and certain of said springs being the conventional bolster supporting helical springs.

8. In a vehicle having a truck, the combination of spring mechanism for supporting a load from said truck, said mechanism comprising a spring assembly including volute spring means, and helical spring means, the turns of said helical spring means being of substantially the same cross-section, members extending across and engaging the ends of said assembly for causing the compression of said helical and volute spring means in parallel when said assembly is compressed, means for maintaining said spring and spring means in position between said members, all elements of said assembly and means for maintaining the same in position being located between the planes of said members, the turns of said volute spring means being adapted to frictionally engage one another for dampening the periodic vibrations of said helical springs while in use on a moving vehicle and constituting a means, aside from the load, for resisting the rebound of said spring assembly after compression in service.

9. In a railway truck having a side frame provided with a bolster opening and a bolster having an end extending into said opening, the combination of a spring assembly comprising a plurality of springs insertable in said opening to a position where the whole assembly is wholly beneath an end of said bolster, for supporting the same, said assembly comprising a plurality of railway car supporting helical springs and at least one other spring arranged outside of all helicals of the assembly and alongside the same and being continuous from end to end thereof, said springs operating in parallel and so positioned as to offer substantially uniform resistance at each side of the center line of the bolster to the downward movement thereof, said other spring having a portion between its upper and lower extremities provided with rubbing surfaces operating to resist harmonic action of said springs and constituting a means, aside from the load, for resisting the rebound of the spring assembly.

10. In a railway truck having a side frame provided with a conventional bolster opening and a bolster having an end extending into said opening, the combination of a spring suspension comprising a plurality of springs capable of being inserted as an assembly in said opening beneath an end of said bolster, said springs operating in parallel and arranged to offer substantially uniform resistance to the downward movement of said bolster at each side of the longitudinal center line thereof, certain of said springs being the conventional bolster supporting helical springs of a railway truck and at least one of said springs having a plurality of its portions between its upper and lower extremities frictionally engaging for dampening the vertical vibration of said suspension during the travel of said truck, said last-named spring being an integral unit.

11. In a railway truck having a side frame and a vertically movable bolster, a spring assembly beneath the plane of said bolster for supporting the bolster from said frame, said assembly comprising a plurality of springs, each having upper and lower bearings, certain of said springs being helical and located vertically beneath the bolster and having turns of uniform cross-section, and at least one of said springs having a plurality of overlapping layers each substantially rectangular in cross-section, some of said layers each having its opposite side faces frictionally engaging faces of adjacent layers for reducing the harmonic action of said spring assembly during the travel of said truck, all of the bearings of said springs lying substantially inwardly of the vertical plane of the outer extremities of said side frame, said springs being arranged to operate in parallel and to offer substantially equal resistance to the downward movement of the bolster at opposite sides of the longitudinal center line thereof.

12. In a railway truck, a side frame having a conventional bolster opening therein and spring bearing portions thereon, a truck bolster having spring bearing portions thereon and an end portion in said opening, and a spring assembly located wholly beneath the bolster and engaging said bearing portions for supporting the bolster from said truck frame, said spring assembly comprising a plurality of springs each having upper and lower bearing portions, certain of said springs having between the bearing portions thereof, a plurality of resilient overlapping layers, each substantially rectangular in cross section, some of said resilient layers each having on its opposite sides rubbing surfaces frictionally engaging surfaces on adjacent layers for reducing harmonic spring action of said assembly, the remainder of said springs being helical, and means locating said springs against displacement in service.

13. In a railway truck, a side frame having a spring seat thereon, a bolster having spring seats on its under surface, a spring assembly having all its parts located between the planes of the seats of said frame and bolster for supporting said bolster from said side frame, said assembly comprising helical spring means and spring means having resilient overlapping portions substantially rectangular in cross-section, some of said overlapping portions each having friction surfaces on its opposite sides for engaging surfaces on adjacent portions for frictionally resisting the periodic vibrations of said assembly during the travel of said truck, all of said spring means operating in parallel and all of said bearings being located substantially inwardly of the vertical plane of the outer extremity of said side frame, and means for positioning each of said spring means.

14. A bolster supporting truck spring assembly for disposition within the window opening of a standard side frame, said assembly comprising the combination of upper and lower spring caps, a tie rod connecting said caps, coil springs interposed between the caps, friction producing resilient means located between said caps, said caps having projecting portions extending inwardly, certain of said portions engaging exteriorly against the friction producing means, certain of said portions engaging within the friction producing means, and certain of said portions being formed to accommodate the tie rod.

15. In a railway truck, a side frame having a spring seat thereon, a bolster having spring seats on its under surface, a spring assembly having all its parts located between the planes of the seats of said frame and bolster for supporting said bolster from said side frame, said assembly comprising helical spring means and spring means having curved resilient overlapping portions substantially rectangular in cross-section, some of said overlapping portions each having a friction surface on at least one of its sides for engaging a friction surface on an adjacent curved overlapping portion for frictionally resisting the periodic vibrations of said assembly during the travel of said truck, all of said spring means operating in parallel and all of said bearings being located substantially inwardly of the vertical plane of the outer extremity of said side frame and outwardly of the longitudinal center line of said truck, and means for positioning each of said spring means.

CYRUS J. HOLLAND.